US009704250B1

(12) United States Patent
Shah et al.

(10) Patent No.: US 9,704,250 B1
(45) Date of Patent: Jul. 11, 2017

(54) IMAGE OPTIMIZATION TECHNIQUES USING DEPTH PLANES

(71) Applicant: Amazon Technologies, Inc., Reno, NV (US)

(72) Inventors: Vivek Shah, Seattle, WA (US); Robert James Hanson, Seattle, WA (US); Nicholas Ryan Gilmour, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 224 days.

(21) Appl. No.: 14/529,009

(22) Filed: Oct. 30, 2014

(51) Int. Cl.
*H04N 7/00* (2011.01)
*H04N 5/225* (2006.01)
*H04N 9/73* (2006.01)
*G06T 7/00* (2017.01)
*H04N 9/07* (2006.01)

(52) U.S. Cl.
CPC ............. *G06T 7/0065* (2013.01); *H04N 9/07* (2013.01)

(58) Field of Classification Search
CPC ........ G06T 2207/10012; G06T 7/0065; H04N 13/0207; H04N 13/0271; H04N 5/2226; H04N 5/23212
USPC .... 348/218.1, 36, 37–43, 222.1, 228.1, 239, 348/335, 345; 396/67, 80, 204; 382/255, 382/274, 282, 286
See application file for complete search history.

(56) References Cited

U.S. PATENT DOCUMENTS

| | | | | |
|---|---|---|---|---|
| 2010/0238344 | A1* | 9/2010 | Tsai | G06F 3/0488 348/361 |
| 2010/0310165 | A1* | 12/2010 | Chen | G06T 5/003 382/167 |
| 2011/0141319 | A1* | 6/2011 | Watazawa | H04N 5/23219 348/240.2 |
| 2012/0069235 | A1* | 3/2012 | Imai | H04N 5/23212 348/333.11 |
| 2012/0327294 | A1 | 12/2012 | Jaffrain et al. | |
| 2013/0278809 | A1 | 10/2013 | Itoh et al. | |
| 2014/0219572 | A1 | 8/2014 | Sassi | |

(Continued)

FOREIGN PATENT DOCUMENTS

DE 102013201769 8/2015
KR 20150090777 8/2015

*Primary Examiner* — Lin Ye
*Assistant Examiner* — Euel Cowan
(74) *Attorney, Agent, or Firm* — Polsinelli LLP

(57) ABSTRACT

A plurality of depth planes corresponding to a scene within a field of view of a camera of a computing device can be computed based on stereographic techniques, infrared transceivers, ultrasonic transceivers, among other approaches. The depth planes can be utilized to independently meter subject matter of interest (e.g., person, object, region, etc.) corresponding to each depth plane to obtain image statistics for each depth plane. The image statistics can be analyzed to determine optimal settings (e.g., focus, exposure, white balance, etc.) for each depth plane, and a camera can be configured to acquire image data according to the optimal settings for one or more of the depth planes. Further, the image statistics can be leveraged for processing portions of the image data that are not optimized during capture. Thus, a final image can reflect optimizations for multiple subject matter of interest located at various distances from a computing device.

20 Claims, 8 Drawing Sheets

(56) References Cited

U.S. PATENT DOCUMENTS

2015/0244949 A1* 8/2015 Laroia .................. H04N 5/2352
                                                             348/296
2015/0379701 A1   12/2015 Börner et al.

* cited by examiner

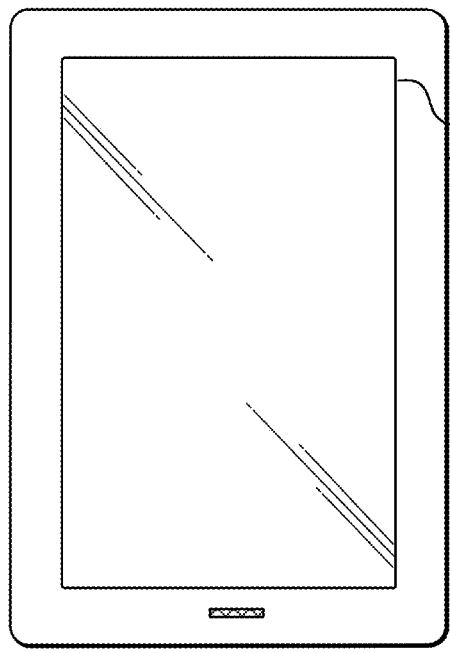
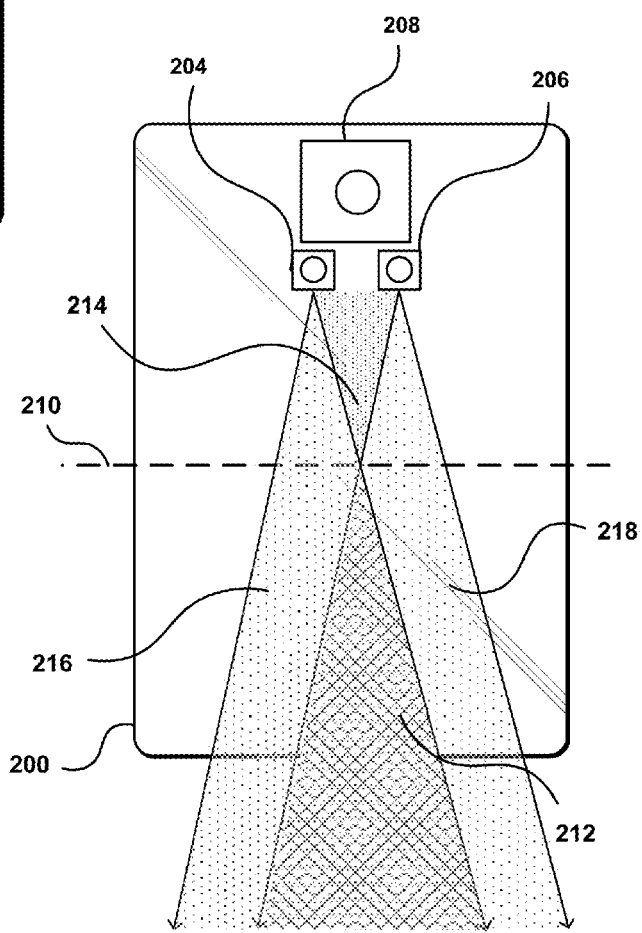
FIG. 2A
FIG. 2B

300

320

340

360

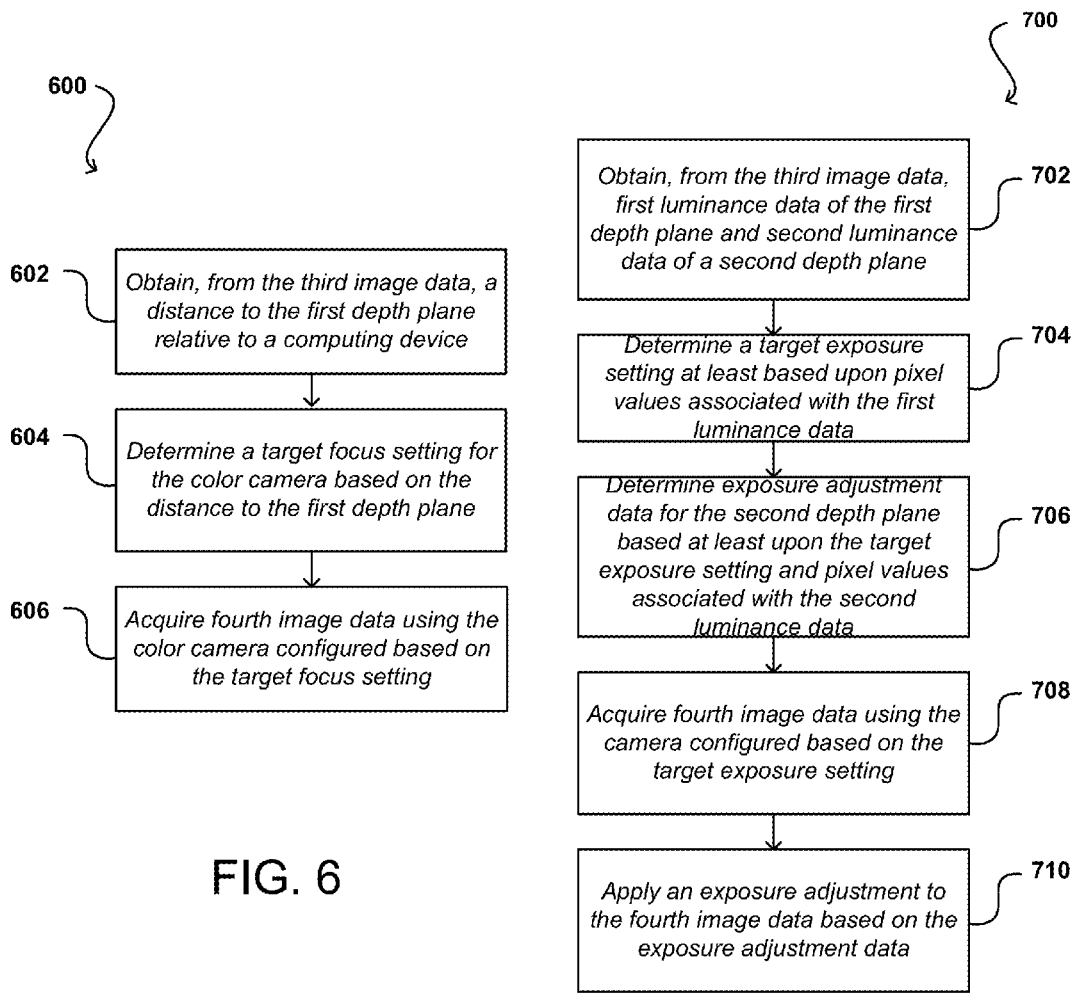

IMAGE OPTIMIZATION TECHNIQUES USING DEPTH PLANES

BACKGROUND

Many personal computing devices, such as smart phones, tablets, and wearable computing devices (e.g., glasses, wristwatches, etc.) include one or more cameras to enable capture of digital image data, such as digital photographs or videos. Users of such personal computing devices find it convenient to be able to casually take pictures or record videos of personal experiences as they arise. While the accessibility and portability of personal computing devices can offer users additional flexibility and convenience, such devices may not necessarily capture the highest quality images and videos. For example, digital image data captured by personal computing devices may have a limited range of brightness, color, and/or contrast and/or the image data may be captured and/or processed according to fixed values for exposure, focus, white balance, and/or other settings that may not be optimized for the entirety of a scene.

BRIEF DESCRIPTION OF THE DRAWINGS

Various embodiments in accordance with the present disclosure will be described with reference to the drawings, in which:

FIGS. 2A and 2B illustrate an example of a computing device that can be used in accordance with an embodiment;

FIG. 6 illustrates an example process for selecting a prioritized depth plane that can be used in accordance with an embodiment;

FIG. 7 illustrates an example of an image processing pipeline that can be used in accordance with an embodiment;

DETAILED DESCRIPTION

Figure 1A:
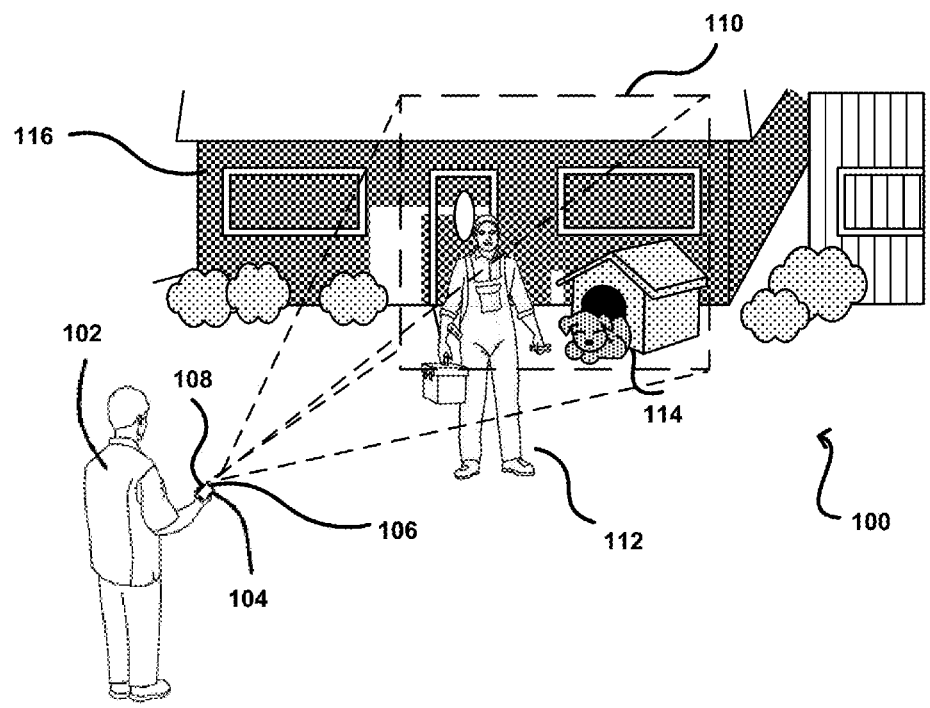
FIGS. 1A-1F illustrate an example of a user capturing an image using a computing device in accordance with an embodiment.

Systems and methods in accordance with various embodiments of the present disclosure may overcome one or more of the aforementioned and other deficiencies experienced in conventional approaches for acquiring and/or processing digital image data using a computing device. In particular, various approaches involve computing a plurality of depth planes or a depth map for a scene to be captured by one or more cameras of a computing device and independently metering or calculating image statistics for each of the depth planes. In some embodiments, respective image statistics for each depth plane can be used to adjust pre-capture settings (e.g., focus, exposure, white balance, etc.) for one or more cameras to acquire image data that is optimal for one or more of the depth planes. In some embodiments, the respective image statistics for each depth plane can be utilized to process raw image data to reflect optimizations for a plurality of the depth planes (e.g., exposure correction, color correction, etc.). In this manner, a final still image (or video) can reflect optimizations for multiple subject matter of interest (e.g., person, object, region, etc.) located at various distances from the computing device.

In some embodiments, the plurality of depth planes can be computed using at least a pair of cameras having at least partially overlapping fields of view. At least a pair of images can be acquired by the cameras, and the images can be analyzed using stereo imaging techniques to determine differences in disparity between the images for estimating the distance between the computing device and the subject matter of interest in each depth plane. Alternatively or in addition, the plurality of depth planes or depth map can be computed based on other sensors for determining distance, such as via light-based transceivers (e.g., infrared, laser), ultrasonic transceivers, among other sensors, and/or other techniques for determining distance, such as time-of-flight, triangulation, phase shift, among other approaches.

In various embodiments, one or more persons, objects, regions, or other subject matter of interest can be detected in each depth plane. In some embodiments, the subject matter of interest in each depth plane can be detected automatically based on techniques such as facial detection, object detection, and/or a fill algorithm for determining a region of interest in a scene based on similarities in depth/distance, luminosity, and/or color. In at least some embodiments, there can also be an interactive component whereby a user can select one or more subject matter of interest within a scene, such as by tapping one or more portions of a touchscreen corresponding to the selected subject matter of interest.

In various embodiments, the plurality of depth planes can be analyzed independently using auto exposure (AE), auto white balance (AWB), auto focus (AF), and/or other image optimization algorithms to compute image statistics for determining optimal or targeted settings for each depth plane. In some embodiments, one or more of the depth planes can be prioritized (e.g., automatically or via user selection), and raw image data can be acquired based on the optimal or targeted settings for the prioritized depth plane(s). Alternatively or in addition, the raw image data corresponding to the prioritized depth plane(s) can be processed according to image statistics determined for the prioritized depth plane(s). Further, image statistics determined for non-prioritized depth plane(s) can also be used to process the raw image data corresponding to the non-prioritized depth planes to adjust values of the raw image data for the non-prioritized depth plane(s) to account for the entirety of the raw image data being captured according to the optimal or targeted settings for the prioritized depth plane(s). Thus, a final image that is presented and/or stored can reflect optimizations for a plurality of depth planes rather than optimization of only the prioritized depth plane(s).

In some embodiments, multiple images can be captured according to optimal or targeted settings determined for each depth plane. For example, one or more first images can be acquired according to the optimal or targeted settings determined for one or more first depth planes and one or more second images can be acquired according to the optimal or targeted settings determined for one or more second depth planes. In at least some embodiments, the first image(s) and the second image(s) can be combined to generate a final image reflecting optimizations for both the first depth plane(s) and the second depth plane(s). Such an approach may be especially advantageous for various types of automatic bracketing, including automatic focus bracketing, automatic exposure bracketing, automatic white balance bracketing, among others.

Various other applications, processes, and uses are presented below with respect to the various embodiments.

FIG. 1A illustrates an example situation 100 of a user 102 preparing to capture an image (or video) of a scene 110 using a camera system 106 of a computing device 104. Although a portable computing device (e.g., a smart phone, tablet, or e-book reader) is shown that can be held in the user's hands, it should be understood that other types of electronic devices can utilize aspects of the various embodiments as should be apparent in light of the teachings and suggestions contained herein. In this example, the scene 110 includes a person 112 standing at a distance closest to the device, a dog 114 laying in a doghouse at an intermediate distance from the device, and a house 116 furthest from the device. Using an appropriate application executing on computing device 104, the user is able to obtain a live preview of the scene for display on a touchscreen 108 of the computing device by positioning the computing device such that the scene is within a field of view of the camera system 106. Thus, the touchscreen can operate as a viewfinder for the camera system 106 before the user takes a snapshot of the scene 110.

Figure 1B:
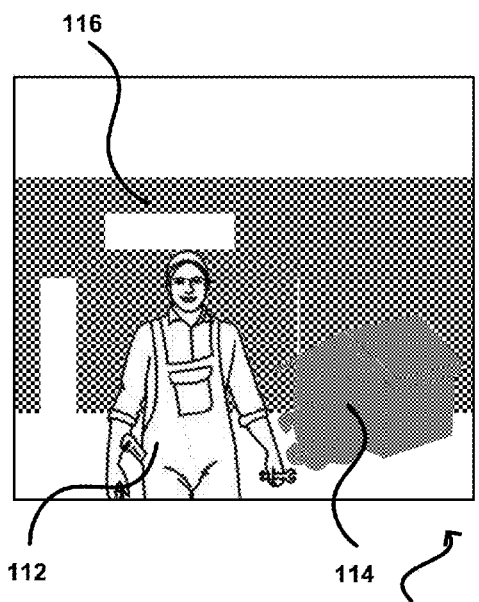

FIG. 1B illustrates an example 120 of a live preview of the scene 110 displayed on touchscreen 108 of computing device 104. In this example, the camera system 106 is configured with first exposure settings such that image data captured by the camera system of the person 112 appears properly exposed while the image data of other subject matter in the scene, such as the dog 114 and the house 116, appear to be underexposed. For example, the person 112, dog 114, and house 116 may be subject to different lighting conditions such as the roof of the house 116 shading the dog 114 and house 116 while the person 112 may not be affected by such shading. Correct exposure of the person 112 and underexposure of the dog 114 and house 116 may be due to a combination of the limited dynamic range of camera system 106 and the first exposure settings. Dynamic range in digital imaging generally refers to the ratio between the maximum and minimum measurable light intensities (i.e., white and black, respectively). The dynamic range of a camera refers to the range at which the camera can successfully capture the lightest and darkest areas of a scene without losing details. When the dynamic range of a scene is greater than the dynamic range of a camera at a particular set of exposure settings, an image captured by the camera may lose details in the darkest parts of the scene, the brightest parts of the scene, or both. In this example, the dynamic range of the camera system 106 and the first exposure settings enable details of the person 112 to be seen in the live preview 120 while the details of the dog 114 and house 116 are lost.

Figure 1C:
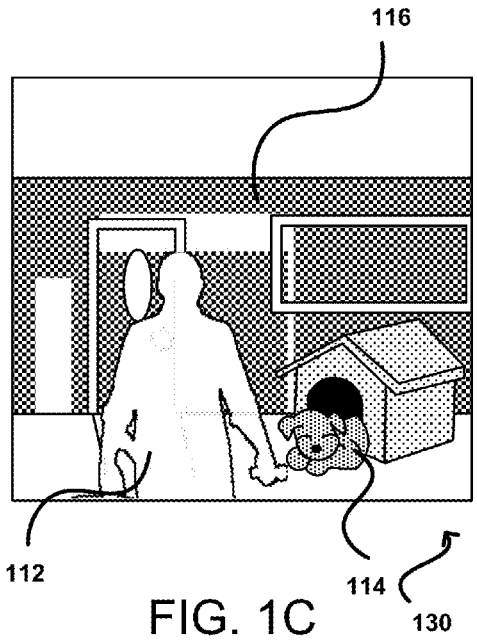

FIG. 1C illustrates an example 130 of a live preview of the scene 110 displayed on computing device 104. In this example, the camera system 106 is configured according to second exposure settings corresponding to a greater amount of exposure than the first exposure settings used to capture the live preview 120 of FIG. 1B. These second exposure settings enable camera system 106 to acquire image data of the dog 114 and house 116 that appears properly exposed while the image data of the person 112 appears to be overexposed. As discussed above, proper exposure of the darker regions of scene 110, e.g., those regions corresponding to the dog 114 and house 116, and overexposure of the lighter regions of the scene, e.g., the region corresponding to the person 112, may be due to a combination of the limited dynamic range of the camera system 106 and the second exposure settings of the camera system 106.

To assist the user 102 in capturing an optimal image of a greater portion of the scene 110, the computing device is configured to calculate a plurality of depth planes or a depth map corresponding to the scene. In some embodiments, a depth map can be calculated using a stereoscopic imaging technique that is applied to at least a pair of images acquired by at least a pair of cameras of a computing device as discussed elsewhere herein. For example, the camera system 106 can include at least two cameras for acquiring an image pair, and the computing device can include a processor (not shown) for analyzing the image pair according to the stereoscopic imaging technique to determine the plurality of depth planes or depth map corresponding to the scene. In other embodiments, other approaches for determining distance can be utilized for computing a depth map or a plurality of depth planes corresponding to a scene. These other approaches can include various types of sensors that emit and analyze reflected sound (e.g., sonar, infrasonic, ultrasonic, etc.) and/or light (e.g., laser, infrared, ultraviolet, etc.), using techniques such as time-of-flight, triangulation, and phase shift, among others.

Figure 1D:
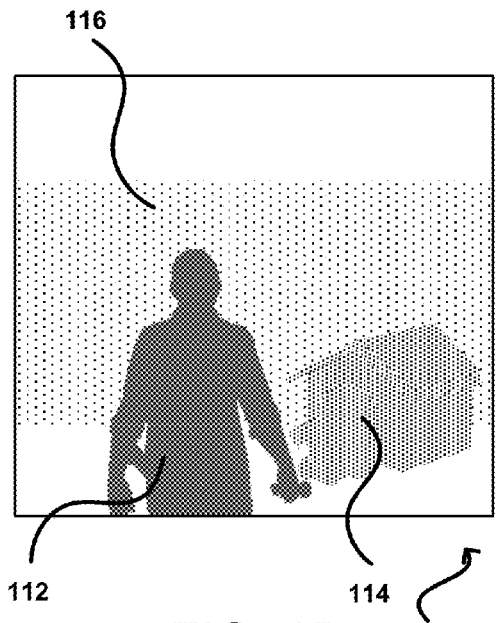

In some embodiments, a fill algorithm can be used to determine one or more subject matter of interest (e.g., person, object, region, etc.) in each depth plane. An example fill algorithm begins at a starting pixel or set of pixels and analyzes neighboring pixels, such as in four directions (e.g., north, east, south, and west), eight directions (e.g., north, northeast, east, southeast, south, southwest, west, and northwest), or other pattern, according to a similarity measure (e.g., depth or distance, luminosity, and/or color) to determine whether the neighboring pixels should be identified as part of the subject matter of interest. If a neighboring pixel meets the similarity criteria, the fill algorithm is recursively performed on that neighboring pixel. If the neighboring pixel does not meet the similarity criteria, there is no further processing of that neighboring pixel. At the end of fill algorithm, all of the pixels determined to be within a similarity threshold as the starting pixel(s) are identified, and these pixels can represent a person, object, or region of interest within a depth plane. FIG. 1D illustrates an example of a depth map 140 that can be computed from the scene 110 using depth or disparity, luminosity, and/or color information and a fill algorithm. In this example, the depth map 140 includes a first depth plane closest to the computing device and corresponding to the person 112, a second depth plane intermediate to the computing device and corresponding to the dog 114, and a third depth plane furthest from the computing device and corresponding to the house 116.

The depth map 140 can be used to optimize image data captured and/or processed by the computing device in several ways. In various embodiments, one or more depth planes of the depth map can be prioritized such that camera settings can be calculated and utilized to configure one or more cameras to acquire image data that is optimized for the prioritized depth plane(s). In some embodiments, the prioritized depth plane(s) can be determined automatically, such as via detecting a face within a depth plane, detecting a particular object within a depth plane, and/or other heuristics (e.g., depth plane(s) corresponding to the center of a scene, depth plane(s) corresponding to the greatest number of pixels of a scene, depth plane(s) having a number of pixels meeting a threshold number of pixels, etc.). In other embodiments, a user can select one or more depth plane(s) that are to be prioritized for acquiring image data. For example, a touchscreen can be utilized as a viewfinder to provide a live preview of a scene prior to capturing an image of the scene. The computing device can be configured to receive a selection of one or more of the depth planes that the user desires to be prioritized by tapping the touchscreen at locations on the touchscreen corresponding to the desired depth plane(s).

Figure 1E:
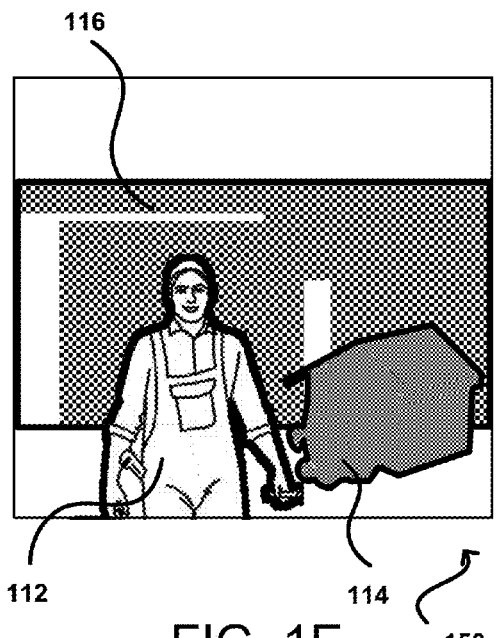

FIG. 1D illustrates an example 140 of a live preview of the scene 110 with no particular subject matter (e.g., person 112, dog 114, and house 116) being focused. FIG. 1E illustrates an example 150 of a live preview of the scene 110 integrated with the depth plane information of depth map 140 of FIG. 1D. In this example, each of the depth planes is distinguished by an outline around the subject matter corresponding to each depth plane, e.g., person 112, dog 114, and house 116. In some embodiments, the outlines of each depth plane may comprise distinct colors to further distinguish between the depth planes. Selection of a particular depth plane may cause the outline of the depth plane to change to a different color and/or luminosity to indicate prioritization of that depth plane. For example, one "color" might represent 0 to 1 meter from a camera, and different "colors" represent 1 to 2, 2 to 5, 5 to 10, 10 to 15, and 15+ meters from the camera, respectively. In some embodiments, a depth map can be determined behind the scenes by the camera system 106 and used to identify boundaries of targets of interest. The pixel values within those boundaries can then be used as inputs for a high-dynamic-range (HDR) feature. The depth map can be used to identify which pixels are of interest based upon determined targets. The determined targets can be determined either manually by user input or automatically (e.g., face detection).

In some embodiments, a depth plane that has been selected for prioritization can be unselected by tapping on a region of the touchscreen corresponding to the depth plane to be deprioritized, and the outline of the deprioritized depth plane can revert to an original color and/or luminosity to indicate deprioritization of that depth plane. In other embodiments, there may be no additional graphical elements for differentiating depth planes. Instead, prioritization (or deprioritization) of a depth plane may be reflected via a live preview showing the effect of selecting (or unselecting) a particular depth plane for prioritization (or deprioritization).

Figure 1F:
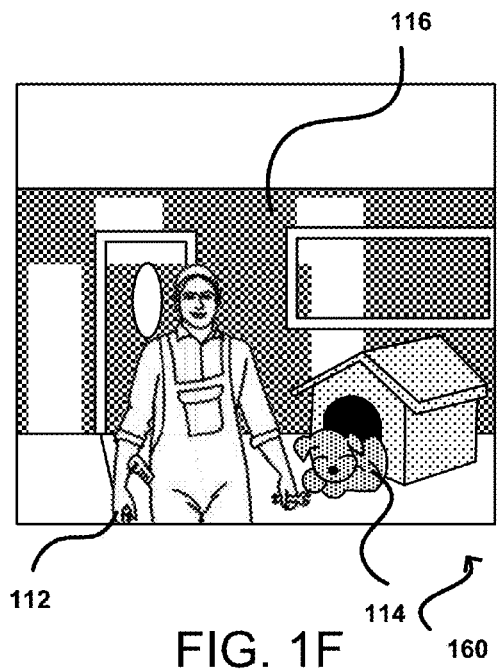

FIG. 1F illustrates an example 160 of a live preview of the scene 110 by independently adjusting high-dynamic-range (HDR) and auto-white-balance (AWB) of the subject matters (i.e., person 112, dog 114, and house 116). In this example, the person 112, dog 114, and house 116 can be optimized independently based on their respective depth planes and presented for the user 102 on the touchscreen 108 of the computing device 104. In some implementations, prioritized weights can be applied to one or more of the plurality of depth planes when dynamic range gain settings are sent to the camera system 106. In various embodiments, each depth plane can be analyzed independently using auto focus (AF), auto exposure (AE), auto white balance (AWB), and/or other image optimization algorithms to compute image statistics for determining optimal or targeted settings for each depth plane. These image statistics and settings can be applicable pre-capture or post-capture of image data.

In some embodiments, one or more cameras can be configured to acquire raw image data according to pre-capture settings determined to be optimal for the prioritized depth plane(s). In certain embodiments, the raw image data can also be processed according to post-capture statistics determined to be optimal for presenting and/or storing a final image. In certain situations, the pre-capture settings determined to be optimal for the prioritized depth plane(s) may not be optimal for every depth plane of a scene. For example, multiple depth planes may be selected for prioritization and pre-capture settings may be optimized for the multiple depth planes in aggregate but the pre-capture settings may not necessarily be optimized for each individual prioritized depth plane. Further, the pre-capture settings may not be optimal for the non-prioritized depth plane(s). Thus, in some embodiments, the raw image data corresponding to each individual depth plane can be processed based on post-capture statistics for each individual depth plane to compensate or correct for the entirety of the raw image data being acquired according to the pre-capture settings determined to be optimal for the prioritized depth plane(s).

In some embodiments, optimal or targeted focus settings can be determined for one or more depth planes corresponding to a scene to be captured by one or more cameras of a computing device by performing an autofocus (AF) algorithm for the one or more depth planes. In certain embodiments, active autofocusing techniques can be utilized for configuring the focus setting of a camera for capturing image data. For example, distance information can be derived from the plurality of depth planes or depth map computed for a scene to adjust the focus distance of a lens of a camera. Approaches for active autofocusing based on a depth map are discussed in co-pending U.S. patent application Ser. No. 14/318,418, entitled, "Adjusting Camera Settings Using Distance Information," filed Jun. 27, 2014, which is incorporated herein by reference. Alternatively or in addition, passive autofocusing techniques based on contrast detection can be performed on image data acquired by a camera to set the focus of the camera for capturing a still image (or video). An example of a passive AF process starts by analyzing a region of image data acquired by the camera, such as a region corresponding to a face or an object of interest, a center of the acquired image data, or a particular region selected by a user. The passive AF process iteratively moves a lens of the camera to search for a lens position that brings the image into an optimal or targeted focus or according to a focus measure, such as min-max, sum-modulus difference, gradient-magnitude, or variance, among other focus, sharpness, and/or contrast measures. Various focus, sharpness, and/or contrast measures are discussed in Mir, Hashim et al., "An extensive empirical evaluation of focus measures for digital photography." *IS&T/SPIE Electronic Imaging*, pp. 902301-902301. International Society for Optics and Photonics, 2014, which is incorporated herein by reference.

In some embodiments, lenses can be moved by motors or other components, such as voice coil motors (VCMs), piezo-electric motors (PE), step motors, micro-electro-mechanical systems (MEMS), and liquid crystal (LQ) devices. These components may run "open loop" without an absolute position feedback mechanism or they may incorporate a position sensor, such as a Hall effect sensor, that can provide an absolute readout of the lens position that can be correlated to a particular distance to the plane of focus in object space. Some components like open loop VCMs and LQ devices do not include a position sensor, and such systems may infer the focal distance from a state of the focus device, e.g., via the drive current or voltage.

The passive AF process results in determining a focus setting of the camera that provides a satisfactory focus and/or sharpness for subject matter of interest in a final image to be captured and stored by the computing device. In some embodiments, a focus measure above an acceptable threshold may not be recognized until it has been passed by, and the focus distance of the lens can then be reversed to the optimal focus. In some embodiments, the entire focus range can be traversed in a fixed number of steps, and the image sharpness can be evaluated at each step. The focus distance of the lens is then set to the step that has the highest sharpness. To maintain optimal focus, the focus distance of the lens can be moved one or two steps in either direction, with focus evaluated for each step and the lens can be moved to the step with the optimal focus. If optimal focus is lost, the full traversing of all steps can be repeated.

In some embodiments, optimal or targeted exposure settings can be determined for each of a plurality of depth planes corresponding to a scene captured by one or more cameras of a computing device. Exposure determines how light or dark an image will appear when it's been captured by a camera, and is typically based on three camera settings: aperture, shutter speed, and ISO. A camera's aperture controls the area over which can light can pass through the camera's lens, and can be specified according to an f-stop value. The area of the opening of the camera lens increases as the f-stop decreases, and, in general, every time the f-stop value is halved, the light-collecting area quadruples. Thus, at a small f-stop, such as f/2, a great deal of light passes through the camera's lens even at a fraction of a second, while at a higher f-stop, such as f/22, only a small amount of light is let in even at longer shutter speeds. Many computing devices incorporate cameras having a fixed aperture, such as f/2.2 or f/2.8. In at least some embodiments, a computing device may incorporate a camera having an adjustable aperture.

A camera's shutter speed (also sometimes referred to as exposure time) determines how long light is permitted to enter the camera. Shutter speed is typically measured in fractions of a second to seconds, and correlates directly with the amount of light entering the camera. For example, when shutter speed or exposure time is doubled, the amount of light entering the camera doubles. Shutter speed or exposure time can also affect the amount of blur within a captured image. When the shutter speed is faster than a moving object or background being captured by a camera, the image will have a limited amount to no blur. When the shutter speed is slower, the captured image may include a greater amount of blur with respect to the moving object or background.

ISO speed (also sometimes referred to as gain) determines a camera's sensitivity to incoming light. Common ISO speeds include 100, 200, 400, and 800, although certain cameras can range from 25 to 3200 (or greater in at least some embodiments). Gain is measured in decibels, and every 3-6 dbs of gain can double the amount of light gathered by a camera's image sensor. For example, in an embodiment, −3 dbs may be the equivalent of ISO 200, 0 dbs may be the equivalent of ISO 320, 3 dbs may be the equivalent of ISO 400, and 6 dbs may be the equivalent of ISO 800, etc. In general, the lower the ISO speed (or gain), the less sensitive a camera's image sensor is to light and the less noise there is in acquired image data; the higher the ISO speed (or gain), the more sensitive the camera's image sensor is to light and the more noise there is in acquired image data.

An exposure value (EV) is a number that represents the interrelationship between aperture, shutter speed, and ISO, and is generally defined as:

$$EV = \log_2 \frac{F^2}{T} + \log_2 \frac{S}{100},$$

where F is the aperture or f-stop value, T is the shutter speed, and S is the ISO speed. In some embodiments, an automatic exposure (AE) algorithm can be performed for each of a plurality of depth planes corresponding to a scene to determine an optimal exposure value for each depth plane. An example of an AE algorithm can involve capturing an image at a predetermined exposure value $EV_{pre}$, converting the RGB values of the captured image to brightness values B, calculating a single brightness value or statistic $B_{pre}$ (e.g., center-weighted mean, median, or other heuristic) from the brightness values, and determining an optimal or targeted exposure value $EV_{opt}$ according to:

$$EV_{opt} = EV_{pre} + \log_2 B_{pre} - \log_2 B_{oot},$$

where $B_{opt}$ is a predetermined ideal brightness value, such as a pre-calibrated 18% gray value. It will be appreciated that $B_{opt}$ can vary according to the subject matter of interest in a depth plane, user preference, camera characteristics, among other possibilities. For example, in an embodiment, $B_{opt}$ can be set to 25% gray when a face is detected in a depth plane.

The brightness value or statistic $B_{pre}$ can be calculated in various ways, such as via spot metering, partial area metering, center-weighted average metering, or multi-zone metering. Spot metering measures a small area of a depth plane (e.g., 1% to 5%) to determine the optimal exposure for acquired image data. Spot metering is typically used for shooting very high contrast scenes. Partial area metering measures a larger area of a depth plane (e.g., 10% to 15%), and is often used when very bright or very dark areas at the edges of the depth plane would unduly influence metering. Center-weighted average metering measures a large area of a depth plane (e.g., 60% to 80%), and this metering approach places more weight on the center part of the metered region and progressively less weight away from the center. Multi-zone metering measures multiple points or regions of a depth plane according to a predetermined pattern (e.g., grid, honeycomb, etc.).

In some embodiments, a final optimal or specified exposure value can be based on only the optimal or specified exposure value(s) determined for the prioritized depth plane(s). In other embodiments, the final optimal or specified exposure value can be a combination of optimal or specified exposure values for prioritized depth plane(s) and non-prioritized depth plane(s), such as an average of the optimal or specified exposure values, a weighting of the optimal or specified exposure values with greater weight for the prioritized depth plane(s), among other possibilities.

Once a final optimal or specified exposure value is determined, one or more cameras can be configured to acquire image data according to the final optimal or specified exposure value, such as by adjusting aperture size, shutter speed (or exposure time), and/or ISO (or gain), where such settings are configurable. Raw image data can then be acquired by the one or more cameras according to the final optimal or specified exposure. However, the acquired raw image data may not necessarily reflect optimal or specified exposure for all of the subject matter within a scene, such as when there are multiple prioritized depth planes having disparate brightness levels and/or when there are differences in brightness levels among prioritized depth planes and non-prioritized depth planes. Thus, in some embodiments, an automatic exposure correction (AEC) algorithm can be performed on at least some portions of the acquired image data to account for when pre-capture settings are not optimized for those portions.

Conventional exposure correction algorithms typically use techniques such as auto level stretch, histogram specification, histogram equalization, gamma correction, among others, that rely on statistics for a whole image for correcting exposure. In certain embodiments, AEC algorithms can be applied independently for a plurality of depth planes to obtain ideal or specified exposures for multiple subject matter of interest in a scene.

In some embodiments, optimal or specified white balance settings can be determined for one or more depth planes corresponding to a scene to be captured by one or more cameras of a computing device by performing an auto white balance (AWB) algorithm for each depth plane. In general, white balance (also sometimes referred to as color balance) is the process of adjusting the intensities of colors (e.g., red, green, and blue) of an image acquired under different types of illumination, which may have an effect on the color of the image. For example, if the color temperature of a light source is low (e.g., indoor light), objects in the image may appear reddish. If the color temperature is high (e.g., natural daylight), objects in the image may appear bluish. Conventional AWB algorithms include Gray World, Perfect Reflector, Iterative White Balance, Color by Correlation, among others. The Gray World AWB algorithm assumes that the green, red, and blue components in a depth plane should average out to a common-gray value. The Gray World algorithm operates by applying a gain factor to red and blue color channels (e.g., $R_{avg}/G_{avg}$ and $B_{avg}/G_{avg}$, respectively) so that their means are equal to the green color channel.

The Perfect Reflector AWB algorithm is based on the assumption that the RGB values of the brightest pixel in an image is the glossy or specular surface. The Perfect Reflector algorithm attempts to equalize the maximum value of the three color channels to produce a white patch. This can be accomplished by locating the brightest pixels $R_{max}$, $G_{max}$, and $B_{max}$, assigning this point as a reference white point, and calculating $R/R_{max}$, $G/G_{max}$, and $B/B_{max}$ for each pixel of the depth plane. Another approach is to leave the green channel unchanged, and adjusting the red channel by $G_{max}/R_{max}$ and the blue channel by $G_{max}/B_{max}$.

The Iterative White Balance algorithm is discussed in Huo, Jun-yan et al. "Robust automatic white balance algorithm using gray color points in images." *Consumer Electronics, IEEE Transactions* on 52, no. 2 (2006): 541-546, which is incorporated herein by reference. The Iterative White Balance algorithm extracts gray color points in an image for estimating the color temperature of a light source corresponding to the image. A gray color point is a point where the R, G, and B components are equivalent under a known standard illuminant. A slight color deviation of the gray color point from gray under a different color temperature is used to estimate the color temperature of the light source. The color temperature estimate can be used to iteratively correct the image data such that the final image data corresponds to the standard illuminant.

The Color by Correlation algorithm is discussed in Finlayson, Graham D. et al. "Color by correlation." Color and Imaging Conference, vol. 1997, no. 1, pp. 6-11. Society for Imaging Science and Technology, 1997, which is incorporated herein by reference. Color by Correlation pre-computes a correlation matrix which defines the extent to which proposed illuminants are compatible with the occurrence of chromaticities in an image. Each row in the matrix corresponds to a different training illuminant. The matrix columns correspond to possible chromaticity ranges result from a discretization of R, G space. The correlation matrix is used to compute the probability that observed chromaticities are due to each of the training illuminants. The best illuminant can be chosen using maximum likelihood estimation. Color correction can be accomplished by adjusting the image data based on the estimated illuminant to a canonical illuminant.

As discussed, various embodiments involve independently metering or calculating image statistics for a plurality of depth planes of a scene, and adjusting pre-capture settings and/or processing acquired raw image data according to post-capture statistics calculated based on the separate metering for each depth plane. FIG. 1F illustrates an example image 160 that has been created using such an approach. For example, user 102 has previously positioned computing device 104 such that scene 110 is within the field of view of camera system 106. User 102 may operate a camera application on computing device 104 that displays a live preview of scene 110 on touchscreen 108. In this example, the computing device 104 can determine a plurality of depth planes (e.g., 112, 114 and 116). Each of the plurality of depth planes may be changed to a particular color and/or luminosity to indicate prioritization of the corresponding depth plane and used to identify boundaries of target of interests. Pixel values with these boundaries can be used to determine HDR features. The target of interests can be determined automatically by using face or object detection algorithms, or manually by user.

An AE process is then performed on image data of the live preview to compute optimal or specified exposure settings for capturing a final image of the scene 110. Image data corresponding to the person 112 and the dog 114 are separately metered, such as by calculating a respective brightness histogram for each of the regions corresponding to the person 112 and the dog 114. The separate metering of each depth plane can be used to determine the range of optimal exposure values for subject matter of interest in the scene 110. In this example, exposure settings (e.g., aperture, shutter speed, and/or ISO) for camera 106 can be adjusted to capture image data according to an exposure value that gives greatest weight to the depth planes corresponding to the person 112 and the dog 114. Here, where two depth planes have been prioritized, the optimal or specified exposure value can be determined by analyzing the respective brightness histograms of the depth planes corresponding to the person 112 and the dog 114. For instance, the final optimal or specified exposure value can be selected by minimizing blown highlights of the brightness histogram corresponding to the person 112 and minimizing clipping of shadows of the brightness histogram corresponding to the dog 114.

Alternatively or in addition, exposure can be corrected via an AEC process. In an embodiment, histogram equalization can be utilized to correct exposure for certain portions of raw image data being acquired according to pre-capture exposure settings that have not been optimized for those portions. A respective brightness histogram can be computed for each depth plane. Peaks in a histogram correspond to brightness values that are common to a depth plane, and valleys in the histogram correspond to brightness values that are less common to the depth plane. Histogram equalization operates by spreading out the brightness values among the peaks and compressing brightness values among the valleys so that the same number of pixels in the depth plane show each of the possible brightness values. This can be accomplished by redistributing brightness values of pixels based on the histogram by shifting the brightness values such that, on average, an equal number of pixels have each possible brightness value. As a result, brightness values can be spread out in those regions having minor variations in luminosity, making it possible to see more details in those regions.

In the example of FIG. 1F, an AWB algorithm is also performed for a plurality of depth planes to optimize white balance for the multiple subject matter of interest in the scene 110. For instance, each of the depth planes can be independently metered using the Gray World or Perfect Reflector algorithm, and the raw image data corresponding to each depth can be adjusted, such as by applying the gain factors to the red and blue channels such that the means are equal to the green channel as in the Gray World algorithm or by adjusting the green channel by $G_{max}/R_{max}$ and the blue channel by $G_{max}/B_{max}$ as in the Perfect Reflector algorithm.

FIGS. 2A and 2B illustrate an example of a computing device 200 that can be used in accordance with various embodiments. FIG. 2A depicts a "front" view of the device including a touchscreen 202 that can operate as a viewfinder for one or more cameras positioned on the "back" of the device and to enable a user to customize settings for image data captured by the camera(s), such as prioritizing one or more depth planes in a scene as discussed elsewhere herein. It should be understood that, while the touchscreen is positioned on the "front" of the device, touch and/or display elements can also be positioned on the "back" or "sides" of the device as well (or instead). Further, directions such as "front," "back," or "sides" are used for purposes of explanation and are not intended to require specific orientations unless otherwise stated.

FIG. 2B illustrates a back view of the computing device 200, which includes a pair of cameras 204, 206 having substantially overlapping fields of view and having parallel optical axes in order to enable stereo image capture. It should be understood, however, that a single camera could be used to capture images and/or video as well within the scope of the various embodiments. Positioned proximate to the pair of cameras 204, 206 is a third camera 208. In some embodiments, the pair of cameras 204, 206 can be panchromatic cameras, and can be physically smaller and/or capture image data at a lower resolution than the camera 208. As used herein, a panchromatic camera is a black and white camera or a monochrome camera that is sensitive to all colors of light, i.e., a panchromatic camera does not have any particular color sensitivity. All colors are represented equally by a panchromatic camera and the image produced by a panchromatic camera is a black and white image. In some embodiments, a panchromatic camera can have no IR-cut filter and can be sensitive down to, for example, 1000 nm. In other embodiments, a panchromatic cameras can include an IR cut filter that has a pass band around the emission of infra-red illumination (e.g., around 830-870 nm). In some embodiments, third camera 208 can be a color camera that is operated to capture image data for displaying a live view of a scene and/or for storing final images or videos to a computing device.

In an embodiment, the pair of stereo cameras 204, 206 can be configured to run at a higher frame rate than the color camera 208. For example, the panchromatic pair of cameras 204, 206 can be configured to operate at 60 frames per second (fps), and the color camera 208 can be configured to operate at 30 fps. In other embodiments, the pair of cameras 204, 206 can be operated at some factor faster than the color camera 208, such as two times or three times faster. The ability to operate the pair of cameras at a faster frame rate can enable quick focus and exposure set-time of a color camera operating at a slower frame rate. For example, the panchromatic cameras are smaller and can operate at a higher frame rate, e.g., 60 fps versus 30 fps for the color camera. Since it can take three or more frames to converge on auto-exposure for the color camera, the stereo cameras can converge in 45 ms versus 90 ms for the color camera. This can save at least 45 ms in capturing a first frame that satisfies one or more image characteristics within a desired range. In an embodiment, color camera 208 may be made or formed by use of a panchromatic camera in conjunction with an optical color fitter, which limits the range or band of light wavelengths which can reach the color camera.

In some embodiments, each camera of the stereoscopic pair of cameras 204, 206 can include an exposure meter, whereby an exposure value can be read from one or both of the cameras prior to the cameras returning from a low power state. As will be described further herein, the exposure value can be used to set at least a shutter speed for proper exposure on at least a portion of the cameras on the computing device, as may include the stereoscopic pair of cameras and the color camera. Such approaches can shorten the time to determine exposure levels that reach at least acceptable exposure levels.

In some embodiments, the stereoscopic pair of panchromatic cameras 204, 206 and color camera 208 can be can be located within a housing or other similar structure, where the cameras are located a predetermined distance from one another. In other embodiments, the cameras 204, 206, 208 are not located with the same housing and instead are positioned within a predetermined distance from one another. In various embodiments, the cameras can be placed in various different arrangements around the device. For example, the cameras can be positioned on the front, rear, sides, and/or corners of the device, allowing for various configurations to implement the various approaches described herein.

In some embodiments, the pair of stereo cameras 204, 206 can be frame synchronized. Frame synchronization can facilitate determining depth or distance information from images acquired by the stereoscopic pair of cameras. For example, any difference between a first image captured by a first camera of the camera pair and a second image captured by a second camera of the camera pair can be assumed to be due to distance or disparity and not due to any motion of objects represented in the image (as may be the case when the cameras are not frame synchronized). This is because the cameras 204, 206 may be line or pixel synchronized. As a result, a corresponding feature point of the second image captured by the second camera of the stereo pair will lie on an epipolar line of a first feature point in the first image captured by the first camera of the stereo pair. Accordingly, corresponding points will be on the same scan lines, allowing for any difference in location between the first image captured by the first camera of the stereo pair and the second image captured by the second camera of the stereo pair to be due to distance or disparity and not due to any relative motion of objects represented in the images (as is the case when the cameras are not frame synchronized).

In some embodiments, at least cameras 204, 206 can be synchronized to a master time-base or other clock that transmits a common synchronization signal, which can enable the cameras to be line or pixel synchronized. In some embodiments, the synchronization signal can include a pulse generated by the master time-base which can be used as a reference point when received by the first camera and the second camera.

In some embodiments, causing the cameras to acquire images at substantially the same time enables the device to calculate a plurality of depth planes or depth map from disparity information obtained from images captured by the stereoscopic pair of cameras. For example, FIG. 2B illustrates an example situation in which the stereo cameras 204, 206 of the computing device 200 are capturing image information over respective fields of views. It should be understood that the fields of view are presented for simplicity of explanation, and that cameras of actual devices can have larger fields of view and smaller dead zones. Further, the cameras on a device might be significantly closer to each other, which can also reduce the size of the dead zones.

In this example, it can be seen that both camera fields of view overlap at a zone 212 or region that is a distance from the device 212. Using conventional stereo imaging approaches, anything closer to the device than this overlap zone 212 will not be able to have disparity information determined, as subject matter within the zone 212 may not be seen by the stereo cameras 204, 206. For instance, subject matter in a zone 214 close to the device and between the cameras 204, 206 will not be seen by either camera and thus cannot be included in the disparity information (unless estimated from previous measurements and motion tracking, for example). There are two zones 216, 218 where subject matter can only be seen by one of the cameras 204, 206, respectively. Again, disparity information cannot be calculated for subject matter in either of these zones. The effect of these zones decreases with distance, such that past a certain distance (e.g., a meter or so for certain devices) the fields of view of the cameras substantially overlap. For objects within the zone 212 viewable by both cameras 204, 206, the relative disparities can be indicative of distances from the camera, even if actual distances are not calculated. Thus, for subject matter having disparities that differ by more than a minimum threshold, it can be possible to designate one of the subject matter as being in front of the other. For subject matter that has more than a specified threshold difference in disparity, for example, that subject matter can be designated as being in different depth planes, such as a foreground, mid-ground, and background, among others.

Figure 3A:
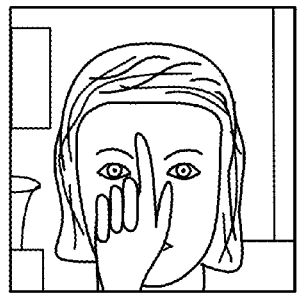
FIGS. 3A, 3B, 3C, and 3D illustrate an example approach for calculating a plurality of depth planes or a depth map in accordance with an embodiment.
Figure 3B:

FIGS. 3A-3D illustrate an example approach for determining a plurality of depth planes or a depth map from at least two images captured at the same time or substantially the same time in accordance with an embodiment. FIG. 3A illustrates what will be referred to herein as a "left" image 300 and FIG. 3B illustrates what will be referred to herein as a "right" image 320, although other orientations can be used as well in other situations and embodiments. These images are each captured by one of a pair of cameras that are offset from each other along a horizontal axis, such that one camera is offset to the left and one is offset to the right in this orientation. As discussed elsewhere herein, pairs of cameras can be offset in up and down directions, among other such options. Since each image is captured using a camera at a slightly different location, the position of objects in each image will be different. In order for the images to combine to determine a plurality of depth planes or a depth map, the cameras used to capture the component images should be sufficiently aligned and/or rectified to represent the correct amount of disparity. When the cameras are aligned, correlating or matching feature points between images captured with a camera pair can be determined based at least in part on an epipolar line between the respective images and determined coordinates for at least one of the feature points.

Figure 3C:
Figure 3D:
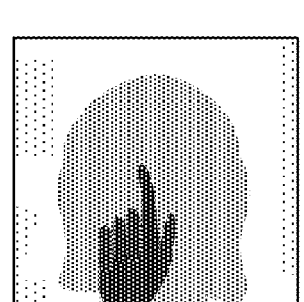

In various embodiments, the pair of front-facing cameras may capture the images simultaneously or substantially simultaneously and therefore would include matching points of interest in their respective images. For example, the user's finger, nose, eyes, eyebrows, lips or other feature points may be identified by the computing device in both images, such as by using a feature detection process known to those of ordinary skill in the art. FIG. 3C illustrates an example combination image 340, and FIG. 3D illustrates a plurality of depth planes or depth map 360 of the combination image 340 showing the relative position of various objects in the captured images 300 and 320. As illustrated, objects closest to the camera (as indicated by darker shading), such as the user's hand, have the greatest amount of disparity, or horizontal offset between images. Objects farther away from the device, such as a painting on the wall, have very small amounts of disparity. Objects between these two areas will have intermediate amounts of disparity based upon the relative distance of those objects from the cameras.

Various approaches can be used to determine a plurality of depth planes corresponding to a scene, such as the example depth map 360 of FIG. 3D, or a stereo disparity map that associates each pixel (x,y) with a disparity value d, i.e., defining a function of (x, y, d). In general, determining stereo disparity can include one or more of the following: a matching cost computation, cost aggregation, disparity computation or optimization, and disparity refinement. Matching cost computations involve analyzing respective regions of a pair of stereo images to determine a similarity measure such as minimizing the sum of squared differences (SSD) or the sum of absolute differences (SAD), or maximizing the normalized cross correlation (NCC) or cross coefficient (CC). If (x,y) represents a pixel in I and (x',y') represents a pixel in T, then these functions can be defined as follows:

$$SSD(x,y) = \Sigma_{x',y'}[T(x',y') - I(x+x',y+y')]^2$$

$$SAD(x,y) = \Sigma_{x',y'}|T(x',y') - I(x+x',y+y')|$$

$$NCC(x,y) = \Sigma_{x',y'}T(x',y')I(x+x',y+y')$$

$$CC(x, y) = \frac{\Sigma_{x',y'}T'(x', y')I(x+x', y+y')}{\sqrt{\Sigma_{x',y'}T'(x',y')^2 \Sigma_{x',y'}I(x+x', y+y')^2}},$$

where T'(x',y') is the average value of T, as defined by:

$$T'(x', y') = T(x', y') - \frac{1}{wh}\Sigma_{x',y'}T(x', y')$$

and I'(x+x',y+y') is the average value of I in the region coincident with T, as defined by:

$$I'(x+x', y+y') = I(x+x', y+y') - \frac{1}{wh}\Sigma_{x',y'}T(x', y'),$$

where x'=0 ... w−1 and y'=0 ... h−1 for SSD, SAD, NCC, and CC.

Matching cost computations can also be based on truncated quadratics, Gaussians, phase responses, filter-bank responses, among others. Another step for disparity computation is cost aggregation, which relates to distributing the matching cost computation over a support region, such as by summing or averaging over a respective window or region of a pair of stereo images. A support region can be either two-dimensional at a fixed disparity or three-dimensional in x-y-d space. Two-dimensional cost aggregation techniques can be based on square windows, Gaussian convolutions, multiple shiftable windows, windows with adaptive sizes, and windows based on connected components of constant disparity. Three-dimensional cost aggregation techniques can be based on disparity differences, limited disparity gradients, and Prazdny's coherence principle. In some embodiments, iterative diffusion can also be used for aggregating the matching cost to a pixel's neighbors. Iterative diffusion operates by adding to each pixel's cost the weighted values of its neighboring pixels' costs.

Disparity computation and optimization can be characterized as local or global. Local methods involve selecting the disparity associated with the minimum (or maximum) cost value at each pixel. As such, local methods are sometimes characterized as a "winner-take-all" approach. Global methods can be based on an energy-minimization function, wherein disparity at each pixel is based on minimizing a global energy. Global methods can also depend on smoothness assumptions made by a particular global algorithm. Once a global energy has been determined, a variety of algorithms can be used to find the disparity at each pixel, including techniques based on Markov random fields, simulated annealing, highest confidence first approaches, and mean-field annealing. Global optimization techniques can also be based on max-flow, graph-cuts, dynamic programming methods, cooperative algorithms, among other approaches.

Refinement techniques can also be used for improving computation of the depth map by determining disparity at the sub-pixel level. One such method is applying iterative gradient descent and fitting a curve to the matching cost computations at discrete disparity levels. Other refinement approaches can include cross-checking (e.g., comparing left-to-right and right-to-left disparity maps), median filtering to compensate for incorrect matching, distributing neighboring disparity estimates to fill in "holes" caused by occlusion, among other techniques.

As discussed, determining a plurality of depth planes or a depth map corresponding to a scene can involve one or more of matching cost computation, cost aggregation, disparity computation or optimization, and disparity refinement. For example, in an embodiment, calculating a plurality of depth planes or a depth map can include determining the matching cost according to a squared difference of intensity values at a particular disparity, aggregating by summing matching costs over square windows with constant disparity, and computing disparities by selecting the minimal aggregated value at each pixel. In another embodiment, the stereo disparity image or mapping can be determined by combining matching cost computation and cost aggregation (e.g., NCC or rank transform).

In other embodiments, the plurality of depth planes or depth map can be determined by setting explicit smoothness assumptions and then solving an optimization problem. Such an approach may not require cost aggregation but instead searches for a disparity for each pixel that minimizes a global cost function that combines matching cost computations and smoothness terms. Minimization can be based on simulated annealing, mean-field diffusion, graph cuts, among others. In still other embodiments, determining the plurality of depth planes or depth map can be based on iterative algorithms (e.g., hierarchical algorithms). Various other combinations can be implemented for computing a plurality of depth planes or a depth map by those of ordinary skill in light of the teachings and disclosure herein.

Figure 4:
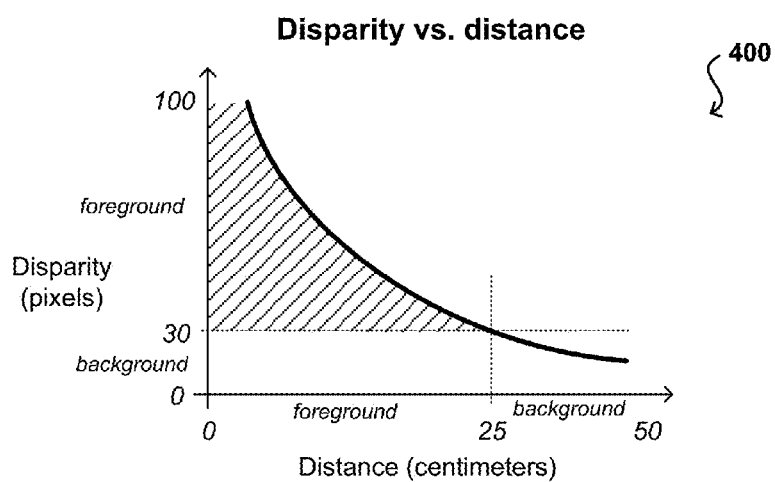
FIG. 4 illustrates an example plot showing a relationship between disparity and distance for an example stereoscopic imaging process that can be used in accordance with various embodiments.

FIG. 4 illustrates an example plot 400 showing a relationship of disparity with respect to distance. As illustrated, the amount of disparity is inversely proportional to the distance from the cameras, such that there can be significantly more disparity in the near camera field (e.g., 0 to 1.0 m) than in the far field (e.g., 1.0 m to infinity). Further, the decrease is not linear but decreases more quickly near the device than at a distance, as objects in the distance can have little to no disparity regardless of whether they are twenty feet away or a mile away. An approach in accordance with various embodiments can determine the distance between an object or feature and the device based on the amount of stereo disparity for the object between two images captured by the pair of cameras. For example, a user's face looking at a smart phone might typically be located within 50 centimeters from the device. By examining the disparity relationship curve 400 or relationship, the computing device (or an application or user of the device) can determine that the amount of disparity at fifty centimeters for the configuration parameters of the current device (e.g., camera resolution, camera separation, field of view, etc.) is twenty five pixels of separation between images. Using this information, the device can analyze matching feature points (e.g., nose, eyes, fingertips, etc.) in the stereo images, and determine the approximate distance between those feature points and the computing device. For example, the amount of disparity, D, at a given distance, d, can be represented by the relationship:

$$D = \frac{f \times B}{d},$$

where f is the focal length of each of the camera pairs and B is the baseline, or distance between the viewpoints of the cameras based at least in part upon their relative positions and separation. In this example, if the focal length of a camera is four hundred pixels and the baseline is five centimeters, for a distance of one meter, the disparity would be twenty pixels. Based on relationships such as this one, the computing device may be able to determine the distance between the object of interest and the device.

As discussed, stereo imaging might not be available on all devices, or may not be sufficient for all conditions. For example, stereo imaging typically requires a minimum amount of contrast in order to be able to correlate the objects in the images captured from each camera. Accordingly, approaches in accordance with various embodiments can utilize different approaches, and/or a combination of approaches, to provide distance determinations useful in determining a plurality of depth planes or a depth map. For example, a computing device might use a light sensor or other such component to determine an amount of light and/or image contrast near the computing device. If a sufficient amount of contrast is present, the device can utilize a stereo imaging approach. If there is not a sufficient amount of contrast, however, the device can attempt to use an alternative (or additional) approach to making distance determinations. If stereo imaging is not available, the device might instead rely on such an approach.

For example, a device can utilize infrared radiation (IR) to attempt to separate subject matter at a first distance from subject matter at a second distance in at least some embodiments, where the device can capture one image while emitting IR radiation and another image without IR radiation. Subject matter at the first distance may show stronger differences as a result of the illumination, which can facilitate the identification of that subject matter. In other embodiments, a single image can be captured and the relative brightness of objects used to separate objects into foreground and background objects or regions, although a single image may not be as reliable as intensity differences can also vary based on color, surface texture, reflectivity, and other such factors. Multi-image based IR-based approaches can suffer from motion effects, however, as the images are captured at different points in time. Stereo imaging captures image information at the same time or substantially the same time, such that there is little to no effect due to motion, other than blur or other such effects. IR-based approaches can produce relatively crisp images, even when there is an amount of motion, but do not work well in bright sunlight, where stereo imaging tends to perform well. IR-based approaches work well up to one meter, for example, but stereo approaches work for longer distances, such as up to three meters, but have blind zones when very close to the device. Stereo and IR based approaches thus complement each other, and can be used together advantageously in at least some embodiments for at least a certain range of conditions. Thus, a device can attempt to determine one or more environmental conditions, such as an amount of light or motion, and can select to use a stereo based approach or an IR based approach, or a combination of both. An advantage to using a combination of approaches is that each individual approach might only give a result with 80% confidence, but using them together can result in a confidence of about 90% or greater in at least some embodiments. It should be noted that approaches described herein are not exclusive. For example, in darkness, the stereo-based approach can be used with an IR illumination-based approach, at least out to the range of the IR illuminator.

In some embodiments, an ultrasonic sensor or other sound-based distance determining sensor can be used to attempt to determine relative distances to objects represented in an image. Using such an approach, the differences in time-of-flight, can be used to determine relative, if not absolute, differences in distance.

Figure 5:
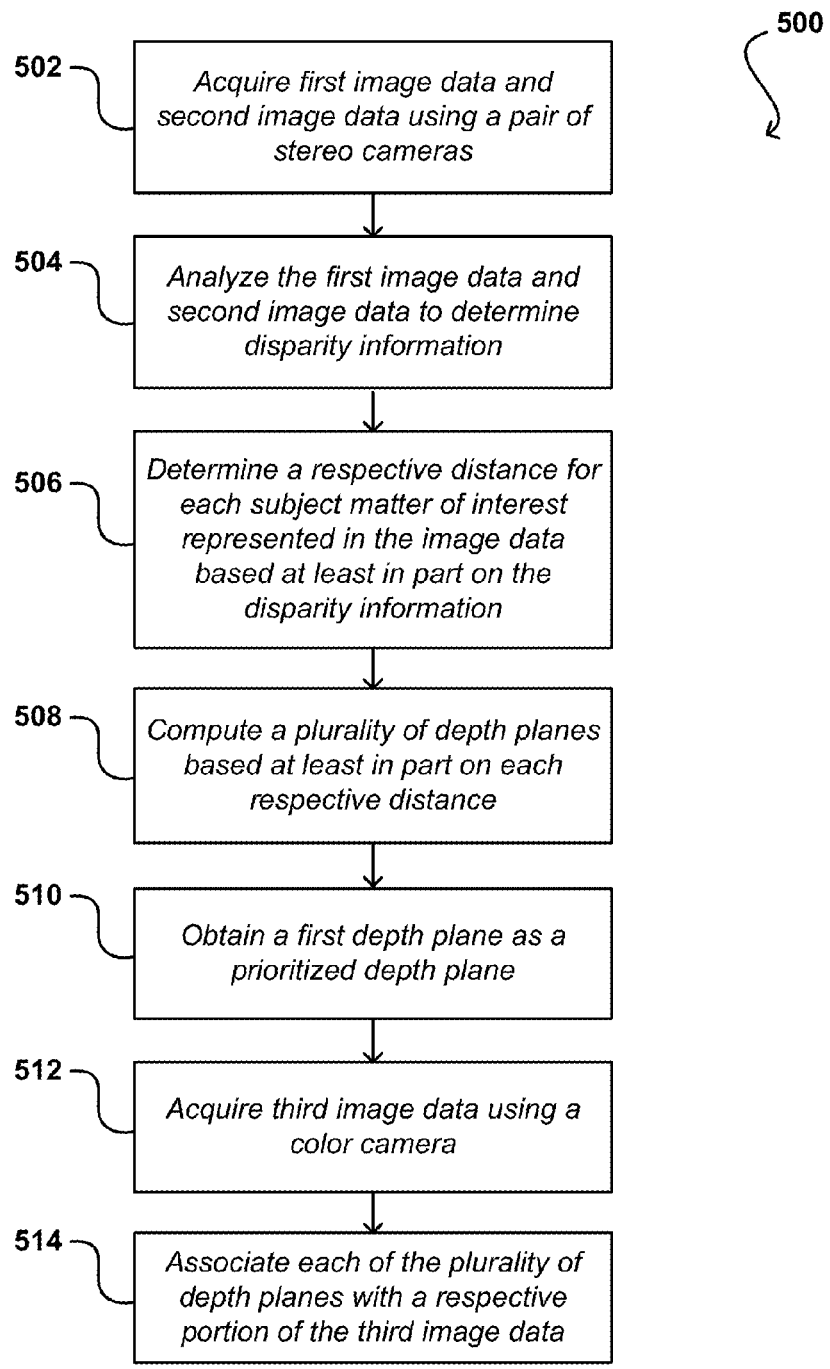
FIG. 5 illustrates an example process for determining camera settings that can be used in accordance with an embodiment.

FIG. 5 illustrates an example process 500 for determining settings of a camera (e.g., focus, exposure, white balance, etc.) that can be used in accordance with an embodiment. It should be understood that, for any process discussed herein, there can be additional, fewer, or alternative steps performed in similar or alternative orders, or in parallel, within the scope of the various embodiments unless otherwise stated. In this example, first image data of a scene is acquired using a first camera and second image data of the scene is acquired using a second camera 502. The scene can include a respective subject matter of interest (e.g., person, object, region, etc.) in each of a plurality of depth planes located at least a respective distance from a computing device. The first camera and the second camera can be a stereoscopic pair of panchromatic cameras having at least partially overlapping fields of view. A third camera, a color camera, can acquire image information for displaying on a touchscreen or other display element of the computing device, where the image information includes a representation of the scene in the field of view of the color camera. In some embodiments, the device can determine corresponding subject matter of interest represented in images acquired by each of the stereo cameras. For example, based at least in part on the relative positions of the stereo cameras, characteristics of the stereo cameras (e.g., focal length, image sensor size, lens, etc.), the distance of each depth plane relative to the device, etc., a correspondence, mapping, or other association of the depth planes represented in the images acquired by each of the stereo cameras can be determined, such as by pixel mapping and/or field of view calibration. In this way, a depth plane represented in an image acquired by a camera can be mapped to the same depth plane in an image acquired by any of the other cameras. This can include, for example, mapping a position or location of the representation of the respective subject matter of interest in each depth plane.

The first image and the second image can be analyzed to determine disparity information 504, where the disparity information corresponds to an amount of disparity for each representation of the subject matter of interest represented in each of the first image and the second image. A respective distance relative to the computing device for the subject matter of interest in each depth plane can be determined 506 based at least in part on a corresponding amount of disparity. In certain embodiments, ultrasonic sensors, infrared intensity differences, or other mechanisms can be used, as discussed elsewhere herein, to determine at least relative differences in distance between two or more depth planes represented in at least the first image. In certain embodiments, based on the distance information, a location of each one of the subject matter of interest can be determined and a plurality of depth planes or depth map can be generated 508, the plurality of depth planes or depth map indicating relative distances of the subject matter of interest with respect to the computing device.

Prioritization of one or more of the depth planes can be obtained 510. A number of approaches can be used to designate one or more of the depth planes as a prioritized depth plane. In an embodiment, the prioritized depth plane(s) can be determined based on a position of one of the subject matter of interest being within a central portion of the first image and the second image. In another embodiment, the prioritized depth plane(s) can be determined based on the subject matter of interest being positioned within a specified distance range from the computing device. In yet another embodiment, a touch-based input can be received on a touchscreen of the computing device. In such an embodiment, the touchscreen can display a live preview of the scene in the field of view of the color camera. The touch-based input can include, for example, a user contacting a portion of the touchscreen displaying the subject matter of interest corresponding to the prioritized depth plane(s). Pixels on the touchscreen can be associated with aspects of the depth map. For example, the pixels of the representations of the respective subject matter of interest in each depth plane can be associated to distance information determined for the respective subject matter of interest. In this way, portions of the pixels displayed on the touchscreen that correspond to a depth plane can be associated with distance information included in the depth map. In response to a touch-based input on the touchscreen corresponding to a selection of a particular depth plane, pixels corresponding to the contact area and associated with a distance can be used to configure settings of at least one camera of the device.

In yet another embodiment, the first image can be analyzed to locate a representation of one or more faces, wherein the prioritized depth plane(s) correspond to a location of the face(s). In at least some embodiments, the prioritized depth plane(s) must exhibit one or more properties other than being closest to the color camera in order to be designated as a prioritized depth plane. For example, a prioritized depth plane may have to be within a specified distance range, such as a range that is not too close to the camera or too far from the camera. If a depth plane is detected that is less than a foot away from a camera, for example, and thus would not be able to be brought into focus for some cameras, that depth plane might not be selected as a prioritized depth plane. Similarly, if the depth plane is far enough away that disparity will not be appreciably distinguishable, that depth plane not be selected as a prioritized depth plane. The prioritized depth plane may also potentially have to be in or near a central region of the image. Such placement indicates that the subject matter corresponding to that depth plane may be likely of interest to the user, and prevents the identification of things like branches or furniture near the edges of the image from being identified as objects to be used for image optimization such as focusing or blur reduction. Other information might be used as well, such as the need to identify or recognize a face for certain applications in order to identify a prioritized depth plane.

Once the prioritized depth plane(s) are identified, third image data can be acquired using the color camera 512. One or more of the depth planes, such as the prioritized depth plane(s), can be metered to determine respective image statistics for each the one or more depth planes 514. The image statistics may correspond to a focus measure, an exposure measure, and/or a white balance measure that can be used to respectively adjust a focus setting, an exposure setting, and/or a white balance setting of the color camera 516.

FIG. 6 illustrates an example process 600 for determining a focus setting of a camera based on a plurality of depth planes in accordance with an embodiment. In this example, a plurality of depth planes and at least one prioritized depth plane have previously been determined, such as by example process 500 of FIG. 5. The process 600 continues by determining image statistics relating to a focus measure, such as a distance to the prioritized depth plane relative to the computing device 602. A focus setting of a camera can be calculated based on the relative distance of the prioritized depth plane and a depth of field of the camera at the relative distance 604. In at least some embodiments, the depth of field can be determined utilizing one of a lookup table that includes a plurality of depth of field settings at corresponding distances or a depth of field computational equation configured to determine the plurality of depth of field settings at corresponding distances. In certain embodiments, a depth of the subject matter of interest may exceed the depth of field. In such a situation, determining the focus setting can include, for example, determining a depth of the subject matter of interest; determining the depth of the area of subject matter of interest to exceed a depth of focus of the color camera; determining a center point of the subject matter of interest based at least in part on the depth of the subject matter of interest; and setting a focus distance of a lens of the color camera to focus on the center point of the subject matter of interest. The focus of the camera can then be adjusted according to the determined focus setting 606.

Various other approaches for optimizing the focus of a still image can be implemented as well. For example, one such approach is automatic focus bracketing. Automatic focus bracketing involves acquiring a plurality of images of the subject matter of interest, each image of the plurality of images being taken at a different focus distance; determining for each image of the plurality of images one or more pixels corresponding to the subject matter of interest having a sharpness level above a predetermined threshold; combining the one or more pixels of the plurality of images into a merged image, wherein the merged image is associated with a depth of field greater than a depth of field of the subject matter of interest represented in any one of the plurality of images. In some embodiments, identifying the subject matter of interest in each of the plurality of images that has a sharpness level exceeding a predetermined threshold or other sharpness threshold can be based on at least one of rise distance evaluation, contrast evaluation (e.g., increase resolution and evaluate contrast), fractal dimension evaluation, edge detection, line detection, shadow detection, feature detection, and/or other suitable image processing algorithms.

FIG. 7 illustrates an example process 700 for determining one or more exposure settings of a camera based on a plurality of depth planes in accordance with an embodiment. In this example, a plurality of depth planes has previously been determined, such as by example process 500 of FIG. 5. Each of the plurality of depth planes can be caused to change to a particular luminosity to indicate prioritization of a corresponding depth plane. In some embodiments, a specific luminosity can be used to represent a specific distance from the camera to a corresponding depth plane. The process 700 continues by obtaining 702 first luminance data of the first depth plane and second luminance data of a second depth plan. In some implementations, to begin performing the calculation, an exposure calculator of some embodiments can be used to determine an average luminance value of the image. The exposure calculator then compares the average luminance to a target average luminance. If the average luminance is higher than the target luminance, then the exposure calculator determines a negative value (which would make the image darker) for the exposure adjustment. If the average luminance is lower than the target luminance, then the exposure calculator determines a positive value (which would make the image brighter) for the exposure adjustment. If the average luminance is equal to the target luminance, then the exposure calculator determines a zero value (i.e., no change in exposure level) for the exposure adjustment.

In some embodiments, boundaries of targets of interest can be determined by using the plurality of depth planes. Pixel values associated with luminance data can be used as inputs to determine exposure settings (e.g., a HDR feature). A target exposure setting can be determined 704 at least based upon pixel values associated with the first luminance data. Exposure adjustment data for the second depth plane can be determined 706 based at least upon the target exposure setting and pixel values associated with the second luminance data. The process 700 continues by acquiring 708 new image data using the camera configured based upon the target exposure setting. An exposure adjustment can be applied 710 to the new image data based upon the exposure adjustment data.

In some embodiments, automatic exposure bracketing can be utilized to obtain a still image that reflects optimal or specified exposure for a plurality of depth planes. For example, each of the plurality of depth planes can be independently metered to determine a respective exposure level for each depth plane. A camera can be configured to capture a plurality of images corresponding to each exposure level. The plurality of images can be combined, such as by examining the average brightness in a small neighborhood around each pixel and calculating a weighted average of the individual scenes from each image so that values that are clipped to black or white are replaced, local contrast is maintained, and the overall scene appearance is preserved.

Figure 8:
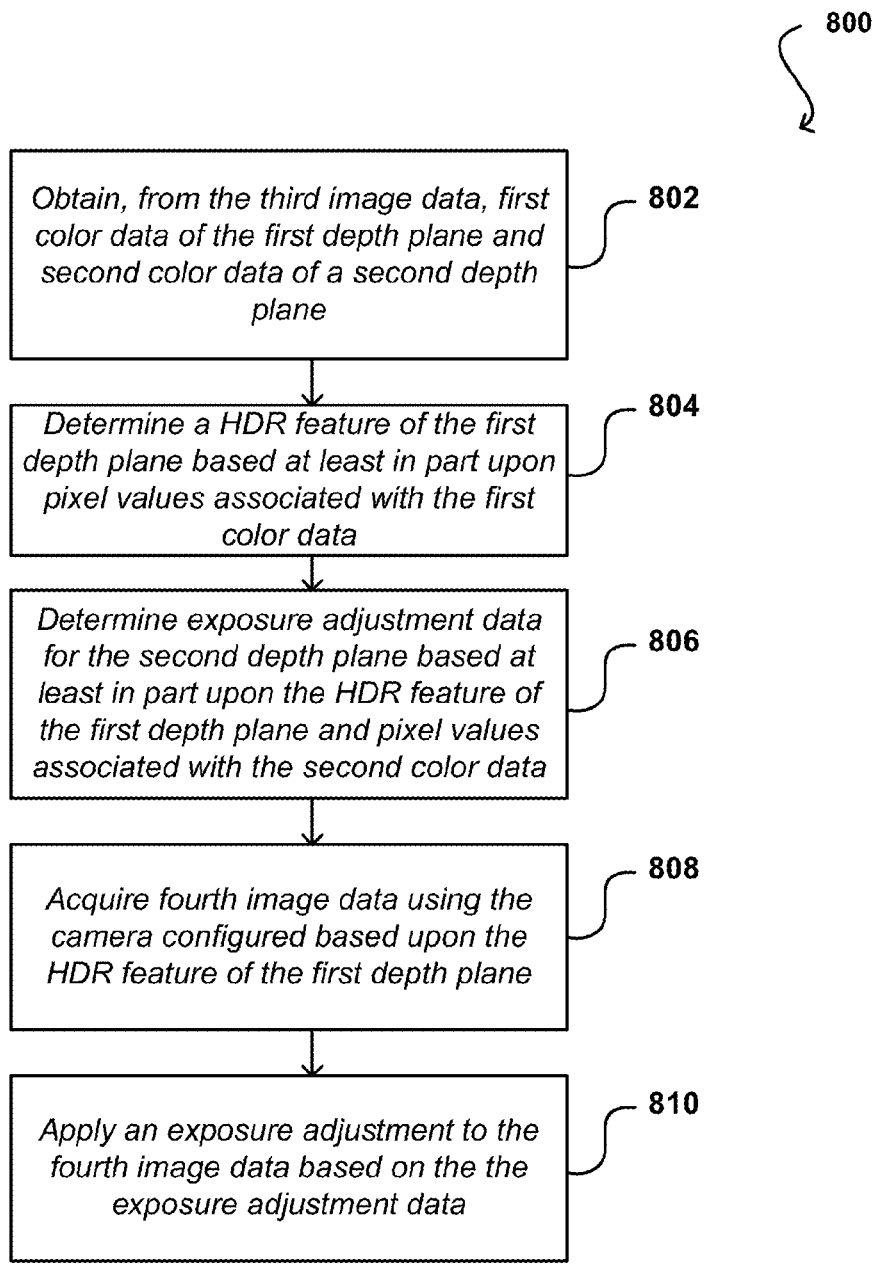
FIG. 8 illustrates an example process for acquiring an image in accordance with various embodiments.

FIG. 8 illustrates an example process 800 for determining a white balance setting of a camera based on a plurality of depth planes in accordance with an embodiment. In this example, a plurality of depth planes has previously been determined, such as by example process 500 of FIG. 5. Each of the plurality of depth planes can be caused to change to a particular color to indicate prioritization of a corresponding depth plane. In some embodiments, a specific color can be used to represent a specific distance from the camera to a corresponding depth plane. Boundaries of targets of interest can be determined by using the plurality of depth planes. Pixel values associated with a particular color can be used as inputs to determine a HDR feature of the corresponding depth plane. The process 800 continues by obtaining 802, from the third image data, first color data for the first depth plan and second color data for a second depth plane.

A HDR feature of the first depth plane can be determined 804 based at least in part upon pixel values associated with at least a subset of the first color data. Exposure adjustment data for the second depth plane can be determined 806 based at least in part upon the HDR feature of the first depth plane and pixel values associated with at least a subset of the second color data. Fourth image data can be acquired 808 by using the camera configured based upon the HDR feature of the first depth plane. An exposure adjustment can be applied 810 to the fourth image data based upon the exposure adjustment data.

In at least some embodiments, automatic exposure adjustment can be utilized to obtain a still image that reflects optimal HDR features for a plurality of depth planes. For example, each of the plurality of depth planes can be independently metered to determine an optimal or specified exposure setting for each depth plane. A camera can capture a plurality of images at each exposure setting, and the images can be combined. As an example, a scene may include a person that is forelit by a candle and background comprising of neon lights. A conventional approach would be to perform exposure setting based exclusively on the person's face such that an exposure setting will be set to a very warm color temperature but result in a cold color temperature for the background, i.e., overcompensating for the orange glow of the candle and causing the background to be overly blue. However, by independently metering exposure setting statistics for a first depth plane corresponding to the person and a second depth plane corresponding to the background, a first image can be captured using a warm exposure setting for the person, a second image can be captured using a cool exposure setting for the blue neon of the background, and the first and second images can be merged to produce a final image that reflects optimal or specified exposure setting for both the person and the background.

Figure 9:
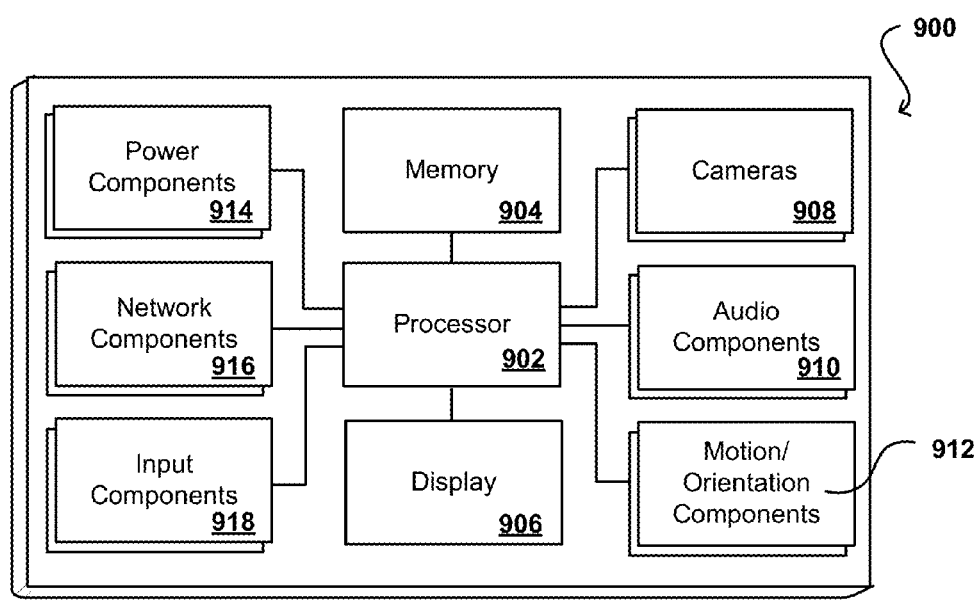
FIG. 9 illustrates an example configuration of components of a computing device such as that illustrated in FIGS. 2A and 2B.

FIG. 9 illustrates a logical arrangement of a set of general components of an example computing device 900 such as the device 200 described with respect to FIGS. 2A and 2B. In this example, the device includes a processor 902 for executing instructions that can be stored in a memory component 904. As would be apparent to one of ordinary skill in the art, the memory component can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology. As discussed, the device in many embodiments will include one or more cameras or image sensors 908 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component 910, such as a mono or stereo microphone or microphone array, operable to capture audio information from at least one primary direction. A microphone can be a uni- or omni-directional microphone as known for such devices.

The device 900 also can include one or more orientation and/or motion sensors 912. Such sensor(s) can include an accelerometer or gyroscope operable to detect an orientation and/or change in orientation, or an electronic or digital compass, which can indicate a direction in which the device is determined to be facing. The mechanism(s) also can (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 902, whereby the device can perform any of a number of actions described or suggested herein.

The computing device 900 includes at least one capacitive component or other proximity sensor, which can be part of, or separate from, the display assembly. In at least some embodiments the proximity sensor can take the form of a capacitive touch sensor capable of detecting the proximity of a finger or other such object as discussed herein. The computing device also includes various power components 914 known in the art for providing power to a computing device, which can include capacitive charging elements for use with a power pad or similar device. The computing device can include one or more communication elements or networking sub-systems 916, such as a Wi-Fi, Bluetooth, RF, wired, or wireless communication system. The device in many embodiments can communicate with a network, such as the Internet, and may be able to communicate with other such devices. In some embodiments the device can include at least one additional input element 918 able to receive conventional input from a user. This conventional input can include, for example, a push button, touch pad, touchscreen, wheel, joystick, keyboard, mouse, keypad, or any other such component or element whereby a user can input a command to the device. In some embodiments, however, such a device might not include any buttons at all, and might be controlled only through a combination of visual and audio commands, such that a user can control the device without having to be in contact with the device.

In some embodiments, the device 900 can include the ability to activate and/or deactivate detection and/or command modes, such as when receiving a command from a user or an application, or retrying to determine an audio input or video input, etc. For example, a device might not attempt to detect or communicate with devices when there is not a user in the room. If a proximity sensor of the device, such as an IR sensor, detects a user entering the room, for instance, the device can activate a detection or control mode such that the device can be ready when needed by the user, but conserve power and resources when a user is not nearby.

In some embodiments, the computing device 900 may include a light-detecting element that is able to determine whether the device is exposed to ambient light or is in relative or complete darkness. Such an element can be beneficial in a number of ways. For example, the light-detecting element can be used to determine when a user is holding the device up to the user's face (causing the light-detecting element to be substantially shielded from the ambient light), which can trigger an action such as the display element to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

In some embodiments, the device 900 can disable features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If speech or voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power. In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the camera and associated image analysis algorithm(s) may be sensitive enough to distinguish between the motion of the device, motion of a user's head, motion of the user's eyes and other such motions, based on the captured images alone. In other embodiments, such as where it may be desirable for an image process to utilize a fairly simple camera and image analysis approach, it can be desirable to include at least one orientation determining element that is able to determine a current orientation of the device. In one example, the one or more orientation and/or motion sensors may comprise a single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using a camera of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts his head to the left or right with respect to the device, the content rendered on the display element may likewise tilt to keep the content in orientation with the user.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

The operating environments can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input component (e.g., a mouse, keyboard, controller, touch-sensitive display element or keypad) and at least one output device (e.g., a display device, printer or speaker). Such a system may also include one or more storage components, such as disk drives, optical storage devices and solid-state storage systems such as random access memory (RAM) or read-only memory (ROM), as well as removable media, memory cards, flash cards, etc.

Such devices can also include a computer-readable storage media reader, a communications component (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage systems or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
a processor;
a first panchromatic camera;
a second panchromatic camera;
a color camera; and
memory including instructions that, upon being executed by the processor, causes the computing device to:
acquire first image data using the first panchromatic camera and second image data using the second panchromatic camera;
determine a plurality of depth planes by analyzing differences in disparity in feature points of the first image data and corresponding feature points of the second image data;
acquire third image data using the color camera;
determine a prioritized depth plane from among the plurality of depth planes;
determine image statistics for at least the prioritized depth plane using the third image data, the image statistics corresponding to measurements for at least one of focus, or exposure;
determine a setting for the color camera based on the image statistics with respect to at least one of a specified focus value, or a specified exposure value; and
acquire an image using the color camera configured with the setting.

2. The computing device of claim 1, wherein the instructions, upon being executed, further cause the computing device to:
determine second image statistics for at least one other depth plane of the plurality of planes using the third image data, the second image statistics corresponding to second measurements for the at least one of focus, or exposure; and
determine pixel values of at least a portion of the image corresponding to the at least one other depth plane by evaluating the second image statistics with respect to the at least one of the specified focus value, or the specified exposure value.

3. The computing device of claim 1, wherein the instructions, upon being executed, further cause the computing device to:
determine second image statistics for at least one other depth plane of the plurality of planes using the third image data, the second image statistics corresponding to second measurements for the at least one of focus, or exposure;
determine a second setting for the color camera by evaluating the second image statistics with respect to the at least one of the specified focus value, or the specified exposure value;
acquire a second image using the color camera with the second setting; and
generate a combined image using at least a portion of the image corresponding to the at least the prioritized depth plane and a portion of the second image corresponding to the at least one other depth plane.

4. A computer-implemented method comprising:
acquiring first image data associated with a first image resolution using a first camera of a computing device;

acquiring second image data using a second camera of the computing device;
determining a plurality of depth planes based on differences in disparity in feature points associated with the first image data and corresponding feature points associated with the second image data;
acquiring third image data, associated with a second image resolution greater than the first image resolution, using at least one camera of the computing device;
determining a prioritized depth plane from among the plurality of depth planes;
determining, from the third image data, image statistics based on pixel values associated with the prioritized depth plane,
determining a first setting for the at least one camera based at least in part on the image statistics; and
acquiring fourth image data using the at least one camera configured with the first setting.

5. The computer-implemented method of claim 4, further comprising:
determining, from the fourth image data, second image statistics based on second pixel values associated with a second depth plane; determining a second setting for the at least one camera based at least in part on the second image statistics; and
acquiring fifth image data using the at least one camera configured with the second setting.

6. The computer-implemented method of claim 5, further comprising:
generating combined image data using at least a portion of the fourth image data corresponding to the prioritized depth plane and a portion of the fifth image data corresponding to the second depth plane.

7. The computer-implemented method of claim 4, further comprising:
acquiring the second image data using a panchromatic camera as the second camera.

8. The computer-implemented method of claim 4, further comprising:
acquiring the second image data using an infrared camera as the second camera.

9. The computer-implemented method of claim 4, further comprising: determining the pixel values associated with the prioritized depth plane using a fill algorithm based on similarities in at least one of depth, distance, luminosity, or color among the pixel values.

10. The computer-implemented method of claim 4, further comprising: determining a second prioritized depth plane from the plurality of depth planes;
determining, from the third image data, second image statistics based on second pixel values associated with the second prioritized depth plane; and
determining the first setting further based at least in part on the second image statistics.

11. The computer-implemented method of claim 4, further comprising: identifying boundaries of representations of targets of interest associated with the prioritized depth plane;
determining, from the third image data, pixels within the boundaries; and
determining the pixel values associated with the prioritized depth plane from values of the pixels within the boundaries.

12. The computer-implemented method of claim 4, further comprising:
determining, from the third image data, an average of a red channel corresponding to the prioritized depth plane;

determining, from the third image data, an average of a blue channel corresponding to the prioritized depth plane;
determining, from the third image data, an average of a green channel corresponding to the prioritized depth plane; determining a first color gain based on the average of the green channel and the average of the red channel;
determining a second color gain based on the average of the green channel and the average of the blue channel;
applying the first color gain to the red channel; and
applying the second color gain to the blue channel.

13. The computer-implemented method of claim 4, further comprising: determining, from the third image data, a maximum pixel value of a red channel corresponding to the prioritized depth plane;
determining a maximum pixel value of a blue channel corresponding to the prioritized depth plane;
determining a maximum pixel value of a green channel corresponding to the prioritized depth plane; determining a first color gain based on the maximum pixel value of the green channel and the maximum pixel value of the red channel;
determining a second color gain based on the maximum pixel value of the green channel and the maximum pixel value of the blue channel;
applying the first color gain to the red channel; and
applying the second color gain to the blue channel.

14. The computer-implemented method of claim 4, further comprising:
receiving a selection of the prioritized depth plane by a user of the computing device.

15. The computer-implemented method of claim 4, further comprising:
determining the prioritized depth plane based on at least one of detecting a face represented in a portion of the third image data corresponding to the prioritized depth plane, determining an object represented in the portion of the third image data corresponding the prioritized depth plane is a specified distance from the computing device, or determining the portion of the third image data corresponding to the prioritized depth plane is within a central region of the third image data.

16. A computing system, comprising:
a processor;
a first camera;
a second camera; and
memory including instructions that, upon being executed by the processor, cause the computing system to:
acquire first image data associated with a first image resolution using the first camera;
acquire second image data using the second camera;
determine a plurality of depth planes based on differences in disparity in feature points associated with the first image data and corresponding feature points associated with the second image data; acquire third image data, associated with a second image resolution greater than the first image resolution, using at least one camera of the computing system;
determine a prioritized depth plane from among the plurality of depth planes;
determine, from the third image data, image statistics based on pixel values associated with the prioritized depth plane;
determine a first setting for the at least one camera based at least in part on the image statistics; and acquire fourth image data using the at least one camera configured with the first setting.

17. The computing system of claim 16, wherein the instructions, upon being executed, further cause the computing system to:
  determine a distance of an object represented in a portion of the third image data corresponding to the prioritized depth plane; and
  determine a focus distance of a lens of the at least one camera based on the distance for configuring the first setting.

18. The computing system of claim 16, wherein the instructions, upon being executed, further cause the computing system to:
  determine a brightness value associated with a portion of the third image data corresponding to the prioritized depth plane; and
  determine at least one of a lens aperture, shutter speed, or ISO setting of the at least one camera based on the brightness value for configuring the first setting.

19. The computing system of claim 16, wherein the instructions, upon being executed, further cause the computing system to:
  determine, from the third image data, an average of a red channel corresponding to the prioritized depth plane;
  determine, from the third image data, an average of a blue channel corresponding to the prioritized depth plane;
  determine, from the third image data, an average of a green channel corresponding to the prioritized depth plane;
  determine a first color gain based on the average of the green channel and the average of the red channel;
  determine a second color gain based on the average of the green channel and the average of the blue channel;
  apply the first color gain to the red channel; and
  apply the second color gain to the blue channel.

20. The computing system of claim 16, wherein the instructions, upon being executed, further cause the computing system to:
  determine, from the third image data, a maximum pixel value of a red channel corresponding to the prioritized depth plane;
  determine, from the third image data, a maximum pixel value of a blue channel corresponding to the prioritized depth plane;
  determine, from the third image data, a maximum pixel value of a green channel corresponding to the prioritized depth plane;
  determine a first color gain based on the maximum pixel value of the green channel and the maximum pixel value of the red channel;
  determine a second color gain based on the maximum pixel value of the green channel and the maximum pixel value of the blue channel;
  apply the first color gain to the red channel; and
  apply the second color gain to the blue channel.

* * * * *